Mar. 6, 1923.

E. G. HULSE.
RESILIENT TIRE.
FILED AUG. 31, 1922.

INVENTOR
EDISON G. HULSE
BY: R. H. Waters
ATTORNEY

Patented Mar. 6, 1923.

1,447,784

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

RESILIENT TIRE.

Application filed August 31, 1922. Serial No. 585,392.

*To all whom it may concern:*

Be it known that I, EDISON G. HULSE, a citizen of the United States, residing at Cumberland, in the county of Allegany and State of Maryland, have invented certain new and useful Improvements in Resilient Tires, of which the following is a specification.

My present invention has for its object the general improvement of resiliency and the correction of certain inherent weaknesses of that type of heavy duty, non-pneumatic tire, mainly dependent for resiliency upon the presence of stress-relieving voids in the structure into which the displaced material within the zone of traction will flow.

The novel improvements herein recited are particularly directed to the further perfection of the type of tire generally shown in Letters Patent No. 1,427,331, dated August 29, 1922; the same being a tire internationally known as the "caterpillar," and referred to by that name throughout this specification. The chief characteristic of this "caterpillar" tire being the presence of deep clefts or notches worked in a particular manner into the sides and partially across the tread face, (with or without secondary voids of specific form) for the purpose of increasing traction, and affording stress relief of the displaced tire structure within the zone of traction; thereby also preventing the phenomena of "cupping"—all as explained in the aforesaid Letters Patent.

By reference to the properties and characteristics of the "caterpiller" tire, and without burdening this specification with a repetition of its well-known features, the herein recited advantages attained by the present invention, when read in conjunction with the visual disclosure by appended drawings, will be readily comprehended by those persons well-skilled in the art of tire making.

To facilitate the discussion of this class of tire, it is noted that the surface of the tread is partially divided by radial traction notches into a double series of semi-independent traction blocks, which, with the contributing support of the central portion of the tread surface, constitute the resilient weight-carrying element. It is often customary to attain additional transverse resiliency by omitting a portion of the tread surface, as by providing a median channel. In the following discussion the terminology above noted will, in general, be adhered to.

Among the many and obvious advantages of my invention over the "caterpillar" type tire of the prior art, may be mentioned:

*a* The provision of greater resiliency and the attainment of that property in a uniform degree circumferentially by extending the voids laterally deep and circumferentially extensive under the tread surface.

*b* The more effective dissipation of the destructive traction wave by providing internal voids, as well as tread notches, whereby frequent lateral interruption of the subsurface disturbance is attained.

*c* The provision of means whereby the transverse edges of the semi-independent traction blocks, lying between adjacent notches, are protected from the peculiar abrading wear, all as more fully described hereafter.

*d* The provision of venting means effective within the central mass of the structure, whereby the destructive heat of friction, due to molecular adjustment under the influence of pressure and velocity, will be harmlessly dissipated.

*e* The provision of extensive internal voids within which extend devices utilized in the molding and vulcanizing treatment during manufacture, thereby intimately distributing the heat treatment throughout the mass to effectively cure the article in the minimum time. The lack of uniform internal vulcanization being a serious obstacle to overcome in ordinary tires of this general class.

*f* The proportioning of the internal undercut voids adjacent the traction notches whereby the edges of the semi-independent blocks are free to rebound radially inward and lose road contact under excessive engine thrust in the presence of conditions of traction that would break down the corresponding portions of the ordinary caterpillar tire, which is often too rigid at that point to release stresses of destructive intensity.

*g* The proportioning and directing of the void spaces, in combination with the other structural characteristics, whereby the above desirable qualities are attained without unduly compromising strength and weight-sustaining properties, and whereby the void spaces are so designed that they will not accumulate road accretions.

It is not a new thought to combine internal openings of various designs with traction and stress-relieving voids; nor is it unusual to resort to external voids in detached relation to the traction notches, or even to combine these internal and external openings with the traction-seeking voids in the attainment of various objectives; but none of the expedients, within my knowledge, provides the novelty of arrangement and functional coordination presented within the scope of this disclosure, without sacrificing some desirable qualities.

The drawings show merely one preferred form of embodying my improvements, it being obvious that many variations from the specific suggestions could be availed of without going beyond the scope of my invention as defined by the appended claims:

Figure 1:
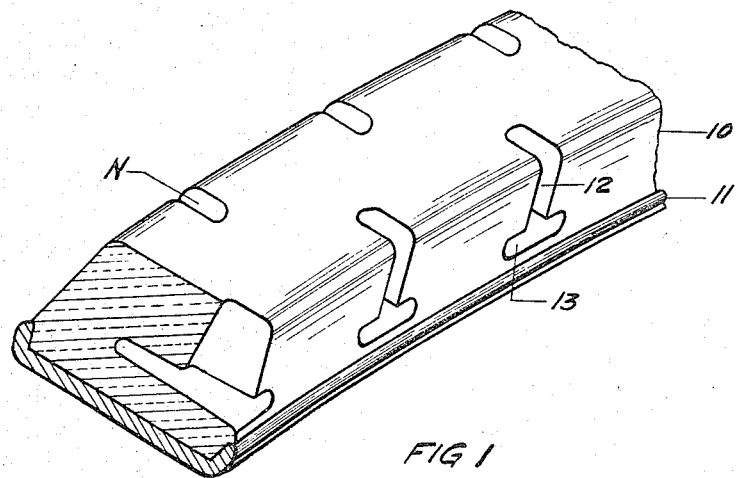
Figure 1 is a fragmental section, in perspective.
Figure 2:
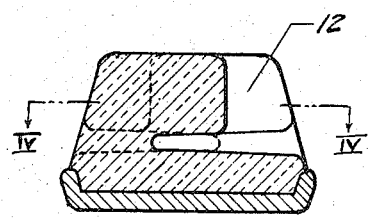
Figure 2 is a cross section taken through a traction notch.
Figure 3:
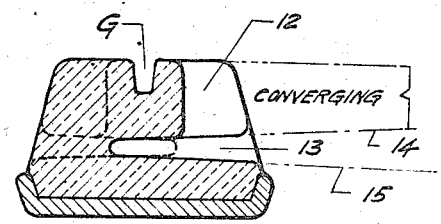
Figure 3 is similar to Fig. 2, except further preferred details are illustrated, including an optional method of increasing transverse resiliency by providing a median tread void.
Figure 4:
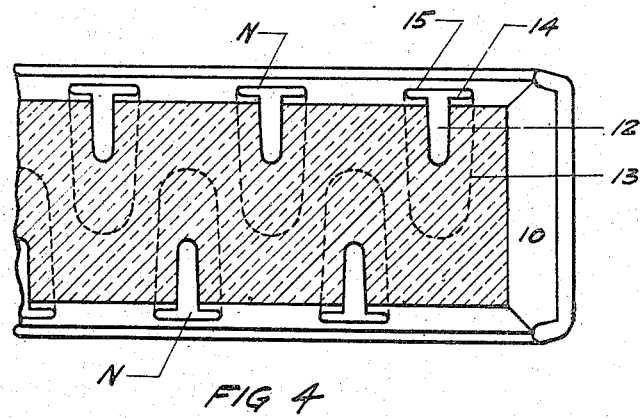
Figure 4 is a longitudinal sectional view taken in the plane IV.—IV. on Fig. 2.

Referring specifically to the drawings; Numeral 10 indicates the main tire structure composed of a suitable resilient rubber compound and preferably formed in a permanent and well-known manner on a metallic channel rim 11. The traction notches, generally, are designated by the letter "N"; specifically, however, this element of my invention takes a very special form, which is an essential feature. My preferred notch has a deep cleft 12 open to the side and tread surface of the structure and in communication with an extensive undercut portion 13 which reaches well under the tread portion farther than the limit of the open portion 12 laterally of the tread surface and likewise of greater extent in a direction circumferential of the tire. As viewed from the side, the traction notch, with its communicating undercut portion, presents a T-shaped appearance—that is, in the preferred form. In order that the portion 13 shall be self-emptying of all water and casual foreign matter, the plane of its side nearest the tread is preferably sloped on the line 14 in a manner convergent toward the transverse plane of the tread; also the sides 14 and 15 are, preferably, formed to diverge, both for the purpose of extruding road accretions and for the additional reason that the withdrawal of the molding lug used to form same is thereby facilitated. If desired, the central portions of the tread may be provided with a void space "G," whereby greater transverse resiliency of the structure is attained; this being a feature especially desired in large tires, and useful also in checking the "cupping" action around the ends of the traction notches.

Figure 5:
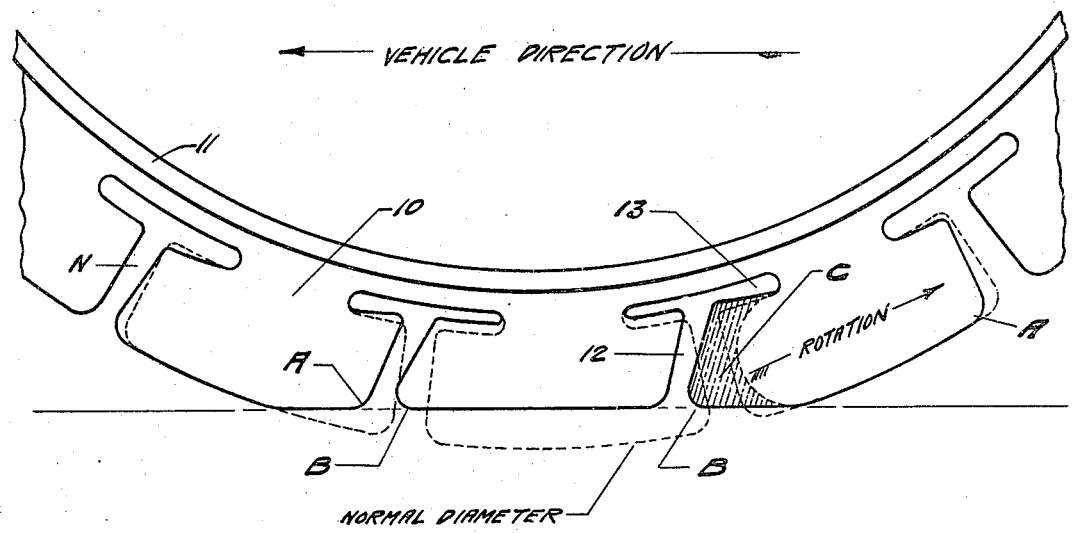
Fig. 5, shows a partial side elevation of my improved tire, under load, for the purpose of better defining the deformation of the structure and the stresses and their location and tendencies.

In Fig. 5, the functional attributes of my improvements are emphasized, and the influence of the peculiarly designed voids upon the reactions of the resilient elements of the tire under driving torque is made apparent. The edges of the traction blocks are designated as "A," the leading edge, and "B," the following edge—as defined by the direction of rotation of the driving wheel. The zone of abrading reaction, "C," of the following edge "B," in its relation to the road surface, "R," is particularly referred to.

The objects of my novel improvements become readily apparent by noting, in Fig. 5, the action of the traction blocks under stress. In this view a new, unabraded tire is shown in typically stressed condition. The entire traction block in full contact with the road is deflected from normal and "racked" circumferentially by the driving torque. The edge "A" of the left hand block is just coming onto the road and the material is being displaced by a lateral bulging action and by a circumferential movement in a direction contrary to revolution, but the leading edge is not exposed to the abrading action present on that of edge "B" just as it leaves road contact; as now explained. As a traction block progressively contacts it is apparent that the "racked" and displaced material will tend to accumulate in the vicinity of that portion of the block last to reach full contact and be held in this unequally stressed condition throughout the duration of full contact of the block. Now, as the leading edge "A" begins to roll out of road contact, it is obvious that the "racked" and displaced material reacts to normal condition as frictional restraint to recovery is lost. In the right hand block of Fig. 5, all but the following edge "B" has lost contact, but it is in this critical position that the utmost abrading action occurs. Here, all the accumulated displaced material is bunched under severe stress and is seeking to rebound to normal as soon as its reactive force overcomes the frictional retardation of the road surface. The shaded area "C" is the zone of concentrated reactive effort, and, as the tire rolls to free the following edge "B," the highly stressed and distorted rubber rebounds in the direction of rotation at the expense of "wiping" or abrading the edge "B."

In Fig. 5, the reactive tendency of the following edge "B" is graphically illustrated. In this improved tire there is, of course, the same characteristic "racking" of the contacting block as in the conventional caterpillar tire; there is likewise the same tendency of the distorted tire media to progressively accumulate in the vicinity of "B," but the difference lies in the character of forces active within the zone "C" as affecting the destructive abrasion along the edge of "B." By removing a considerable amount of active internal resilient material at the cross arm of the T-shaped notch "N," it is at once apparent that the edges "A" and "B" are made to lose much of their activity and become relatively inert. This inertness, or loss of ability to rebound circumferentially, prevents the "wiping" off of the edge "B," to a large degree; thereby overcoming a principal defect in prior tires of this general class.

Another advantage of "softening" the traction edges of my tire is illustrated in directing attention to the fact that the unrelieved traction edges of the notches of the conventional tire are often the cause of the destruction of the entire structure under condition wherein the notch "clutches in" too strongly on the road bed and the full rated effort of the engine in reduced gear is suddenly applied to move a stalled truck. Under such circumstances, if the vehicle cannot be started and the traction is perfect, the edge of the impelling notch may be completely spawled off, or indeed, the entire tire stripped from its hard rubber anchorage on the metallic rim—conditions which are constantly being brought to the attention of the adjusting department of distributors of these tires. Now, in my tire, the relieved edges of the traction notches, under conditions recited above, are free to collapse radially inward in the presence of excessive and uselessly applied driving torque, thereby saving the tire from the consequences noted.

The benefit of uniform resiliency throughout the circumference of the tire is apparent, and is admirably attained by the staggered arrangement of the opposed notches with their extensive undercut areas passing from each side alternately to a lateral position preferably beyond the median plane of the tire and approaching contact, circumferentially, as near as consistent with strength and weight-sustaining requirements.

In order to facilitate drainage of the undercut notches, they are preferably inclined toward the tread, and also preferably provided with converging sides in order that the palpitating action within the zone of road contact shall work to expel any casual foreign matter that may have found lodgment therein—this last named tendency being of considerable moment in view of experiences with tires having "trapped" openings directly open to road accretions and incapable of self-elimination.

While the disclosure of record does not illustrate variations that could be availed of to accomplish the fundamental purposes of this invention—which are many and will be obvious to those skilled in the art—attention is directed to the statement that my disclosure is intended merely as a preferred form, efficient of performance and economical to produce by the unitary molded method, and therefore not a limitation of the precise geometrical proportions or form contemplated to be protected by the appended claims.

Having thus described my invention, what I claim is:

1. A resilient tire of the class described comprising, radially disposed traction notches uniformly spaced in staggered relation with opposed notches, and resiliency-imparting voids extending under the tread portion, each of said voids being in open communication with a side of the tire and with one of said traction notches.

2. A resilient tire of the class described comprising, radially disposed traction notches uniformly spaced in staggered relation with opposed notches, and resiliency-imparting voids extending under the tread portion alternately from each side, each of said voids being in open communication with a side of the tire and with one of said traction notches.

3. A resilient tire of the class described comprising, radially disposed traction notches uniformly spaced in staggered relation with opposed notches, and resiliency-imparting voids extending under the tread portion alternately from each side, each of said voids being in open communication with a side of the tire and with one of said traction notches, said voids in plan view being more extensive under the tread laterally and circumferentially than said traction notches.

4. A resilient tire of the class described comprising, radially disposed traction notches uniformly spaced in staggered relation with opposed notches, each notch being in open communication with both tread surface and a side wall of the tire, said notches having inwardly directed walls terminating in an enlarged void undercut laterally and circumferentially of said walls below the surface of the tread.

5. A resilient tire of the class described comprising, radially disposed traction notches in the opposed sides of the tire, each notch being in open communication with both tread surface and a side wall of the tire, said notches having substantially radially directed walls terminating in an enlarged void undercut with respect to said walls and in open communication with a side wall of the tire.

6. A resilient tire of the class described comprising, radially disposed traction notches in the opposed sides of the tire, each notch being in open communication with both tread surface and a side wall of the tire, said notches having substantially radially directed walls terminating in an enlarged void undercut with respect to said walls and in open communication with a side wall of the tire, whereby, when viewed from the side, the combined opening of notch and undercut void presents a T-shaped contour.

7. A resilient tire of the class described comprising, radially disposed traction notches in the opposed sides of the tire, each notch being in open communication with both tread surface and a side wall, said notches having substantially radially directed walls terminating in an enlarged void undercut with respect to said walls and in open communication with a side wall of the tire, said undercut voids extending laterally from each side beyond the median plane of the tire structure.

8. A resilient tire of the class described comprising, stress-relieving voids extending deeply within the tire intermediate the tread and rim-attaching portion alternately from opposed sides, and traction notches in open communication with the tread, the side walls of the tire and the said voids, said notches being of less extent laterally and circumferentially than said voids.

In testimony whereof I affix my signature.

EDISON G. HULSE.